US005416713A

United States Patent [19]

Kameda et al.

[11] Patent Number: 5,416,713

[45] Date of Patent: May 16, 1995

[54] OBSTACLE AVOIDANCE APPARATUS

[75] Inventors: Hiroshi Kameda; Kohei Nomoto; Yasuo Tachibana, all of Kamakura, Japan

[73] Assignee: Mitsubishi Denki Kabushiki Kaisha, Tokyo, Japan

[21] Appl. No.: 139,187

[22] Filed: Oct. 19, 1993

[30] Foreign Application Priority Data

Oct. 30, 1992 [JP] Japan .................................. 4-292734

[51] Int. Cl.[6] ......................... G06F 15/50; G06F 9/00

[52] U.S. Cl. .................................... 364/461; 364/444; 364/449; 342/455

[58] Field of Search ............... 364/461, 460, 462, 444, 364/447, 449, 456; 395/90, 119; 367/909; 342/29, 450, 32, 455

[56] References Cited

U.S. PATENT DOCUMENTS

| | | | |
|---|---|---|---|
| 4,809,178 | 2/1989 | Ninomiya et al. | 364/443 |
| 4,862,373 | 8/1991 | Meng | 364/444 |
| 5,006,988 | 4/1991 | Borenstein et al. | 364/424.02 |
| 5,056,031 | 10/1991 | Nakano et al. | 364/461 |
| 5,150,452 | 9/1992 | Pollack et al. | 395/90 |
| 5,179,329 | 1/1993 | Nishikawa et al. | 364/449 |

OTHER PUBLICATIONS

"Collision Avoidance Control Among Moving Obstacles for a Mobile Robot on the Fuzzy Reasoning", vol. 6, No. 6, Dec. 1988 Maeda et al.

Cho et al, "Intelligent Motion Control Strategy for a Mobile Robot in the Presence of Moving Obstacles", IEEE, Nov. 3-5, pp. 544-546, 1991.

Isik et al., "Pilot Level of a Hierarchical Controller for an Unmanned Mobile Robot", IEEE, pp. 241-255, 1988.

Nomura et al., "A Learning Method of Fuzzy Inference Rules by Descent Method", IEEE, pp. 203-210, 1992.

Yen et al., "Designing an Adaptive Path Executing System", IEEE, pp. 1459-1464, 1991.

*Primary Examiner*—Kevin J. Teska
*Assistant Examiner*—Tan Q. Nguyen
*Attorney, Agent, or Firm*—Wolf, Greenfield & Sacks

[57] ABSTRACT

An obstacle avoidance apparatus including a target data generator for outputting observation values of a target, a static obstacle driver for expressing a static obstacle by a turning acceleration of the target, a characteristic amount extractor for outputting characteristic amounts for representing first control amounts of a destination direction and a static obstacle avoidance by the turning acceleration, and a control amount determiner for outputting a second control amount of the target based on the first control amounts. A three-dimensional obstacle is expressed by the turning acceleration looked at from the target and the control amount for avoiding the obstacle until the target reaches a destination is determined.

13 Claims, 12 Drawing Sheets

OBSTACLE AVOIDANCE APPARATUS

BACKGROUND OF THE INVENTION i) Field of the Invention

The present invention relates to an obstacle avoidance apparatus for automatically piloting or controlling an aircraft or an automobile so as to avoid an obstacle to go toward a destination and a radar information processing apparatus for predicting a route to the destination.

ii) Description of the Related Arts:

Conventionally, in an obstacle avoidance apparatus for such a purpose, from information of a target, an obstacle and a destination in two dimensions, characteristic amounts required for grasping a positional relationships between these are extracted, and a piloting or controlling amount to the target is determined based on the postional relationshipS.

FIG. 12 illustrates a conventional obstacle avoidance apparatus in two dimensions, constructed in accordance with the prior art as shown in "Dynamic Obstacle Avoidance Control of Movable Robot by Using Fuzzy Inference", by Yohichiro MAEDA and Seiichi TAKEGAKI, proceedings of Robot Society of Japan, Vol. 6, No. 6, 1988. In this case, from positional relationship between a target to be controlled, an obstacle and a destination, a control amount to the target is output.

First, the construction of the conventional obstacle avoidance apparatus will be described in connection with FIG. 12. In FIG. 12, a target data generator 1 observes a target to be navigated and outputs observation values of the target, and a movable obstacle data generator 2 outputs obstacle data. A characteristic amount extractor 4 outputs characteristic amounts for grasping a relationship between the target and the obstacle and between the target and the destination, and a control amount determiner 5 outputs a control amount for controlling the target. In the target data generator 1, a sensor 11 observes the target and outputs corresponding signals, and a data processor 12 receives the corresponding signals output from the sensor 11 and processes the same to output a position Pr and a speed Vr of the target. In the movable obstacle data generator 2, similar to the target data generator 1, a sensor 13 observes a movable obstacle and outputs corresponding signals, and a data processor 14 receives the signals output from the sensor 13 and processes the same to output a position Po and a speed Vo of the obstacle. In the characteristic amount extractor 4, a static risk calculation element 26 calculates and outputs a static risk $\alpha$ caused by the static relationship between the target and the obstacle from the position Pr and the speed Vr of the target output from the target data generator 1 and the position Po and the speed Vo of the obstacle output from the movable obstacle data generator 2, and a dynamic risk calculation element 27 calculates and outputs a dynamic risk $\beta$ caused by a relative speed of the target to the obstacle. Further, a movable obstacle avoidance amount calculation element 16 receives the static risk $\alpha$ and the dynamic risk $\beta$ output from the static risk calculation element 26 and the dynamic risk calculation element 27 and outputs an avoidance control amount C required for avoiding the obstacle based on the static risk $\alpha$ and the dynamic risk $\beta$, and a destination control amount calculation element 23 calculates and outputs a destination direction vector as a destination control amount D required for heading the target toward the destination based on the target observation values Pr and Vr output from the target data generator 1 and destination data stored in a destination data memory 21. In the control amount determiner 5, a control amount determination element 28 determines a balance between the avoidance control amount C output from the movable obstacle avoidance amount calculation element 16 and the destination control amount D output from the destination control amount calculation element 23 according to a rule table 29 and outputs a control amount M of the target.

The operation of the conventional obstacle avoidance apparatus described above will now be described in connection with FIG. 13. First, in step ST1, the observation of the target is carried out by the sensor 11 and the signals of the sensor 11 are processed by the data processor 12 to output the target observation values Pr and Vr in the target data generator 1. In step ST2, similarly, the observation of the obstacle is carried out by the sensor 13 and the signals of the sensor 13 are processed by the data processor 14 to extract the obstacle observation data Po and Vo in the movable obstacle data generator 2. Next, moving forward to step ST4, in order to obtain the avoidance control amount C and the destination control amount D as the characteristic amounts, the processings in steps ST4*a* to ST4d are executed in the characteristic amount extractor 4. That is, in step ST4*a*, the static risk $\alpha$ is calculated in the static risk calculation element 26 and in step ST4*b*, the dynamic risk $\beta$ is calculated in the dynamic risk calculation element 27. Also, in step ST4*c*, the control amount D in the destination direction is calculated in the destination control amount calculation clement 23 and in step ST4*d*, the movable obstacle avoidance amount C is calculated in the movable obstacle avoidance amount calculation element 16. In step ST5*b*, from the characteristic amounts, the control amount M controlling the observed target is determined in the control amount determiner 5. In step ST8*b*, it is discriminated whether or not it is possible for the target to reach the destination. When the answer is YES, the operation is finished, or when the answer is N0, the operation is returned to step ST1 to repeat the above-described operation again.

In the conventional obstacle avoidance apparatus, as described above, the characteristic amounts are extracted by the above arrangement and the control amount of the target is successively determined until the target reaches the destination while avoiding the obstacle. However, considering a three-dimensional obstacle, the obstacle is not a point but a landform or terrain having a complicated form and a height and thus a steering the obstacle avoid can not be achieved in the relatively simple manner just described.

SUMMARY OF THE INVENTION

Accordingly, it is an object of the present invention to provide an obstacle avoidance apparatus in view of the aforementioned problems, which is capable of readily modeling a three-dimensional obstacle to extract characteristic amounts and to output a control amount of a target until successfully reaching a destination.

An obstacle avoidance apparatus according to the present invention is provided with a static obstacle driver for expressing a static obstacle in terms of a critical turning acceleration required for a target to avoid the obstacle within a predetermined time, in comparison with a conventional obstacle avoidance apparatus.

In another obstacle avoidance apparatus of the present invention, it is supposed that an observation side is also novable and an own data generator for understanding an own apparatus position, that is, a position of the observation side relative to the target, is further provided.

In a further obstacle avoidance apparatus of the present invention, an autopilot of an aircraft is supposed and a dynamic characteristics calculator for obtaining conditions of the own apparatus or the observer after a predetermined time from control amounts calculated.

Still another obstacle avoidance apparatus of the present invention is further provided with an own data generator for observing the condition of the own apparatus obtained from the GPS (Global Positioning System) satellite and a movable obstacle data generator for understanding the movable obstacle which corresponds to the movable target.

In the obstacle avoidance apparatus according to the present invention, the three-dimensional obstacle having a complicated form can be expressed by several characteristic amounts, and a predictive control amount needed for the target to avoid the obstacle and to direct to the destination can be obtained.

In another obstacle avoidance apparatus of the present invention, in the case of the observation side moving on, the predictive control amount of the target can be obtained.

In a further obstacle avoidance apparatus of the present invention, the autopilot of the aircraft can be realized by calculating its dynamic characteristics.

In still another obstacle avoidance apparatus of the present invention, the conditions of the own apparatus can be extracted by the GPS satellite and the control amount for avoiding the movable obstacle can be obtained.

BRIEF DESCRIPTION OF THE DRAWINGS

The objects, features and advantages of the present invention will become more apparent from the consideration of the following detailed description, taken in conjunction with the accompanying drawings, in which:

FIG. 2 is a flow chart showing an operation of the

DESCRIPTION OF THE PREFERRED EMBODIMENTS

Figure 1:
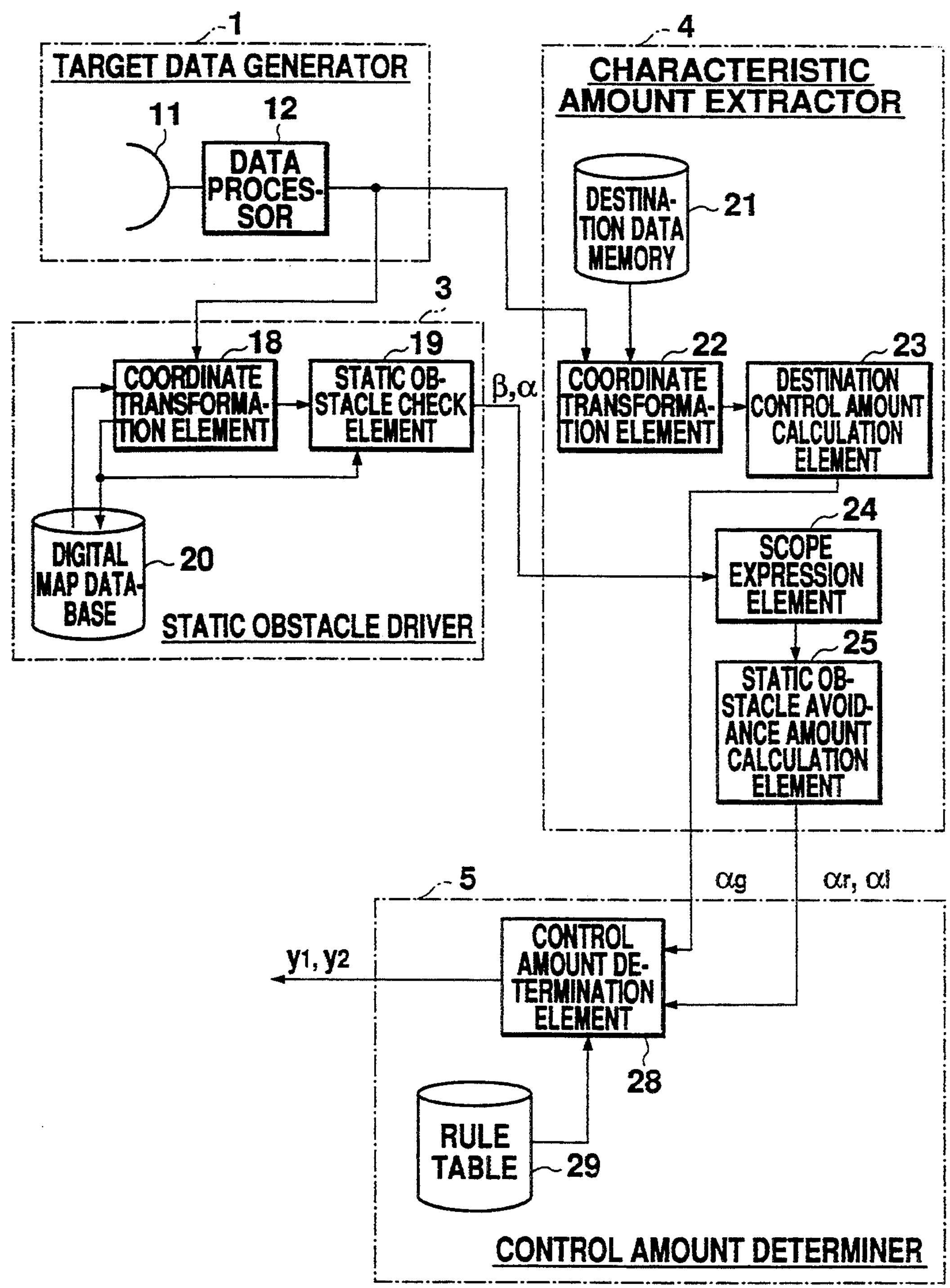
FIG. 1 is a block diagram of a first embodiment of a obstacle avoidance apparatus according to the present invention.

The present invention will now be described in connection with its preferred embodiments with reference to the accompanying drawings, wherein like reference characters designate like or corresponding parts throughout the views and thus the repeated description thereof can be omitted for brevity.

Figure 12:
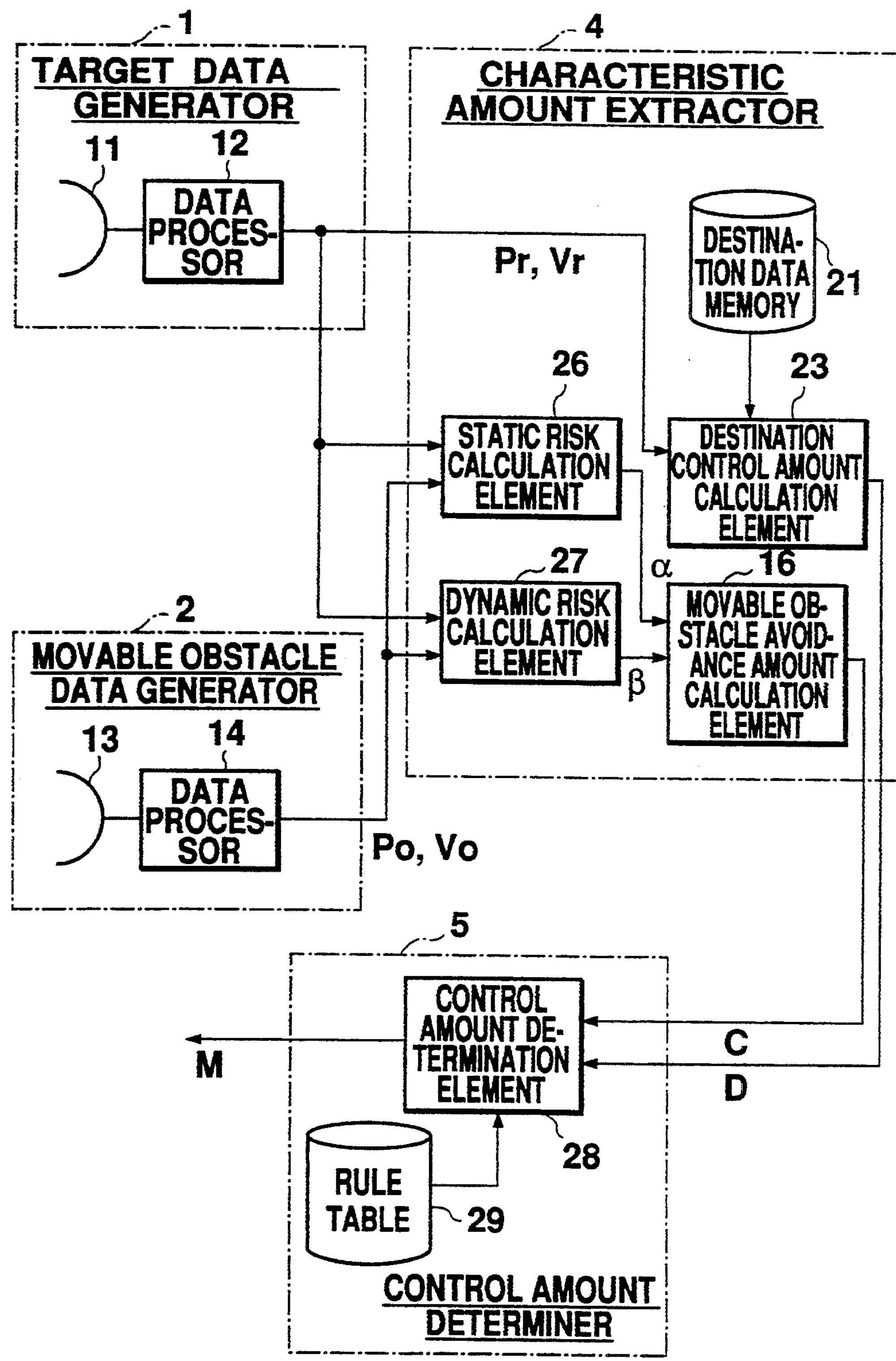
FIG. 12 is a block diagram of a conventional obstacle avoidance apparatus.
Figure 13:
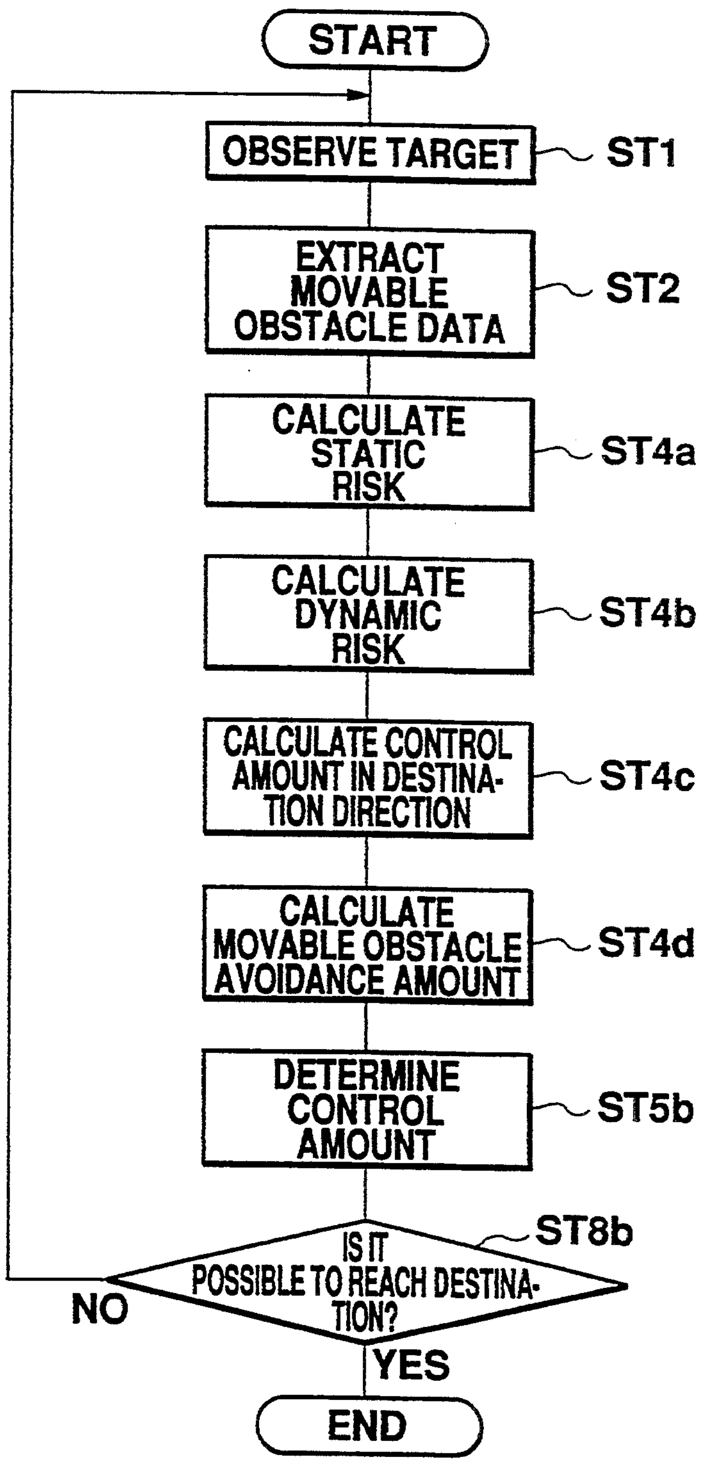
FIG. 13 is a flow chart showing an operation of the conventional obstacle avoidance apparatus shown in FIG. 12.

FIG. 1 illustrates the first embodiment of an obstacle avoidance apparatus according to the present invention, wherein the same parts as those of the conventional obstacle avoidance apparatus shown in FIG. 12 are designated by the same symbols. In FIG. 1, a target data generator 1 observes a target to be navigated and outputs target observation values such as a position and a speed of the target, and a static obstacle driver 3 expresses a static obstacle by a turning acceleration of the target on the basis of the target observation values output from the target data generator 1 and digital data of a map stored in a digital map database 20 and outputs static obstacle information. A characteristic amount extractor 4 calculates characteristic amounts for grasping a positional relationship between the target and the static obstacle and a positional relationship between the target and a destination from the static obstacle information expressed by the turning acceleration as the output of the static obstacle driver 3, and a control amount determiner 5 calculates a control amount of the target from the characteristic amounts output from the characteristic amount extractor 4 and outputs the calculated control amount of the target.

In the target data generator 1, a sensor 11 observes the target to output corresponding signals and a data processor 12 receives the signals output from the sensor 11 and processes the same to output the target observation values. In the static obstacle driver 3, a coordinate transformation element 18 transforms the obstacle into relative information with respect to the target, and a static obstacle check element 19 calculates a critical vertical turning acceleration action $\beta$ necessary for the target to avoid the static obstacle in a predetermined time from the target observation values and the static obstacle information in the form of a coordinate output from the coordinate transformation element 18.

In the characteristic amount extractor 4, a scope expression element 24 executes a scope expression of the static obstacle information expressed by the turning acceleration, and a static obstacle avoidance amount calculation element 25 receives the output of the scope expression element 24 and calculates a characteristic amount $\alpha_r$, $\alpha_1$ as an avoidance control amount required for the static obstacle avoidance to output the avoidance control amount. Further, a coordinate transformation element 22 transforms destination information stored in a destination data memory 21 into relative information with respect to the target, and a destination control amount calculation element 23 calculates a characteristic amount $\alpha_g$ as a destination control amount required for heading the target to the destination direction based on the relative information output from the coordinate transformation element 22 and outputs the calculated destination control amount.

In the control amount determiner 5, a control amount determination element 28 determines a balance between the avoidance control amount and the destination control amount according to a rule table 29 and outputs a horizontal turning acceleration $y_1$ and a vertical turning acceleration $y_2$ as a control amount of the target.

Figure 2:
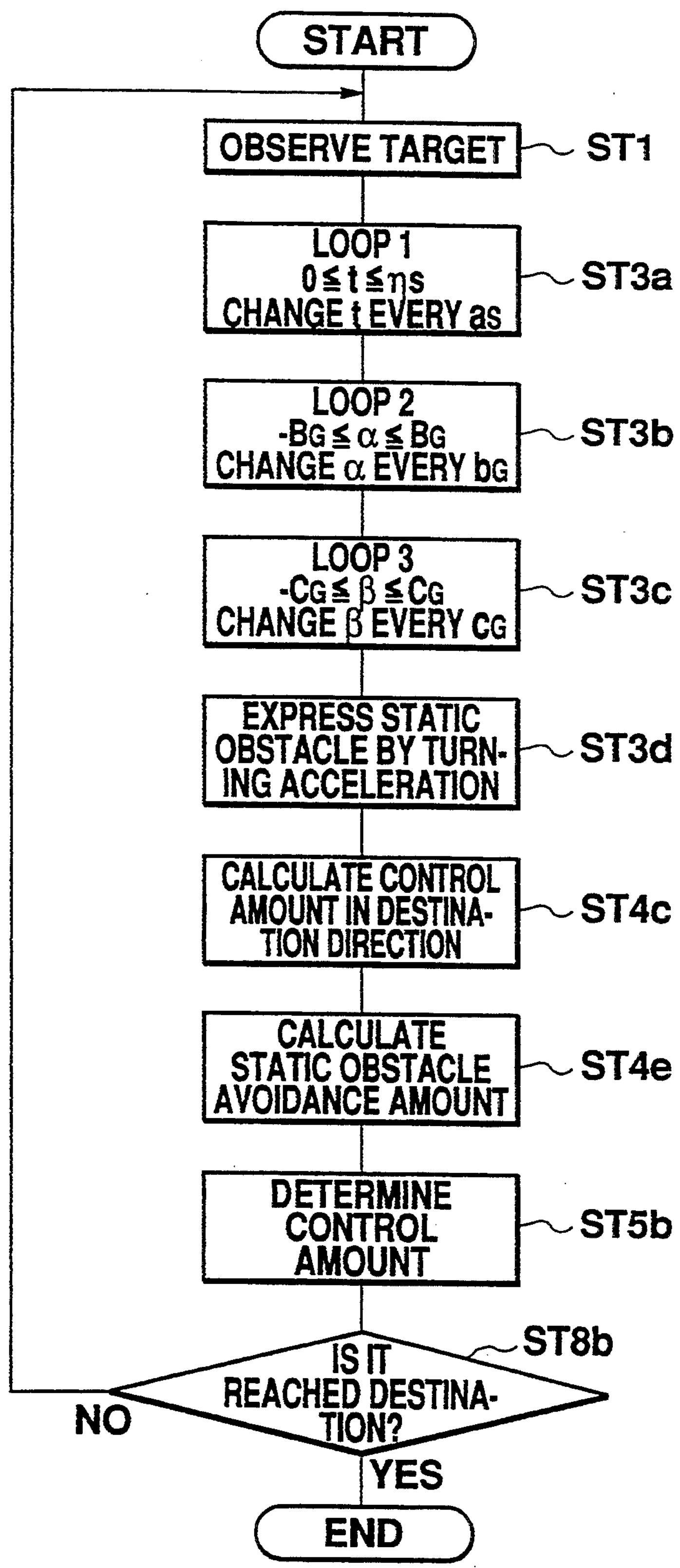

The operation of the above-described obstacle avoidance apparatus will now be described in connection with FIG. 2.

First, in step ST1, the observation of the target is carried out by the sensor 11 and the signals of the sensor 11 are processed by the data processor 12 to output the target observation values such as the position and speed of the target in the target data generator 1.

Next, moving to step ST3, that is, in step ST3*a*, a time is looped from 0 to $\eta_s$ every $a_s$, in step ST3*b*, the horizontal turning acceleration $\alpha$ is varied from $-B_G$ to $+B_G$ every $b_g$, and in step ST3*c*, the vertical turning acceleration $\beta$ is varied from $-C_G$ to $+C_G$ every $C_G$. Also, in step ST3*d*, from the temporarily obtained value $(t, \alpha, \beta)$ on the basis of the loop, the coordinates of the target are calculated, and, when the calculated coordinates of the target are coincident with the data stored in the digital map database 20, the horizontal and vertical turning accelerations at this time are determined to the static obstacle data. In this manner, the critical vertical turning acceleration for enabling avoidance of the static obstacle is output from the static obstacle driver 3.

In step ST4*c*, the horizontal turning acceleration for directing the target to the destination direction is output from the destination data memory 21 after the predetermined time $\eta_s$. Then, in step ST4*e*, when the static obstacle expressed in step ST3 becomes below the vertical turning acceleration $\eta=0$, the horizontal turning acceleration at this time is obtained and the static obstacle avoidance amount as the characteristic amount is output.

In step ST5*b*, with due consideration of the positional relationship between the target and the static obstacle by the characteristic amounts, the horizontal and vertical turning accelerations $y_1$ and $y_2$ as the control amount of the target are output. Calculation formulas (1) to (5) used in these processings are described as follows:

$$\omega = \frac{\sqrt{\alpha^2 + \beta^2}}{V} \tag{1}$$

$$r = \frac{V}{\omega} \tag{2}$$

$$x = r \cdot \cos\left(\tan^{-1}\frac{\beta}{\alpha}\right) \cdot (1 - \cos\omega t) \tag{3}$$

$$y = r \cdot \sin\omega t \tag{4}$$

$$z = r \cdot \sin\left(\tan^{-1}\frac{\beta}{\alpha}\right) \cdot (1 - \cos\omega t). \tag{5}$$

$\alpha$: horizontal turning acceleration
$\beta$: vertical turning acceleration
$\omega$: angular velocity
r: turning radius (x, y, z): (east longitude, north latitude, altitude)

In step ST8*b*, it is discriminated whether or not it is possible for the target to reach the destination. When the answer is YES, the operation is finished, or when the answer is NO, the operation is returned to step ST1 to repeat the above-described operation again.

Figure 3A:
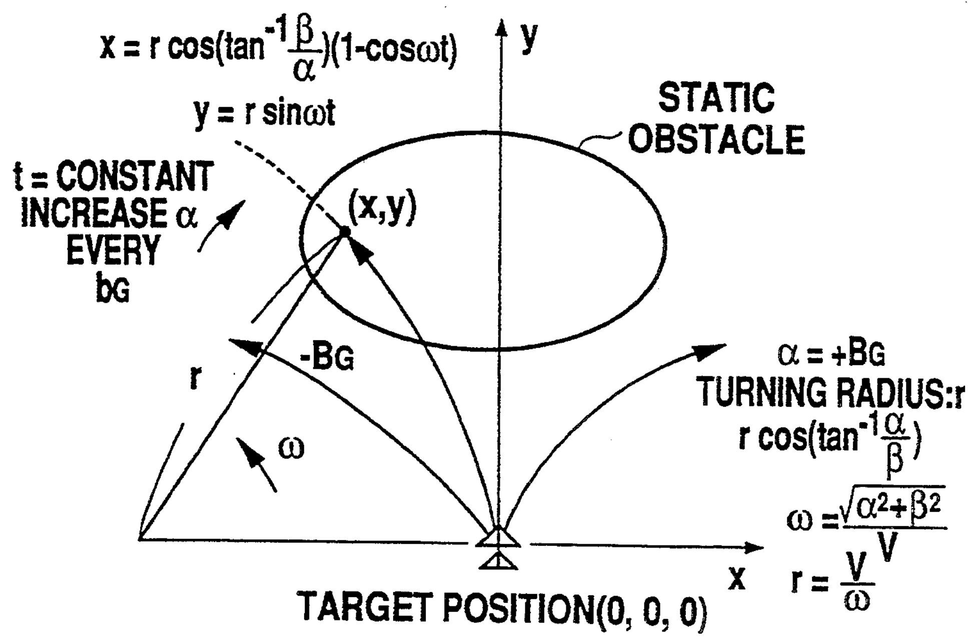
FIGS. 3A and 3B are schematic top and side views showing a deriving method for expressing a turning acceleration of a static obstacle in the obstacle avoidance apparatus shown in FIG. 1.
Figure 3B:
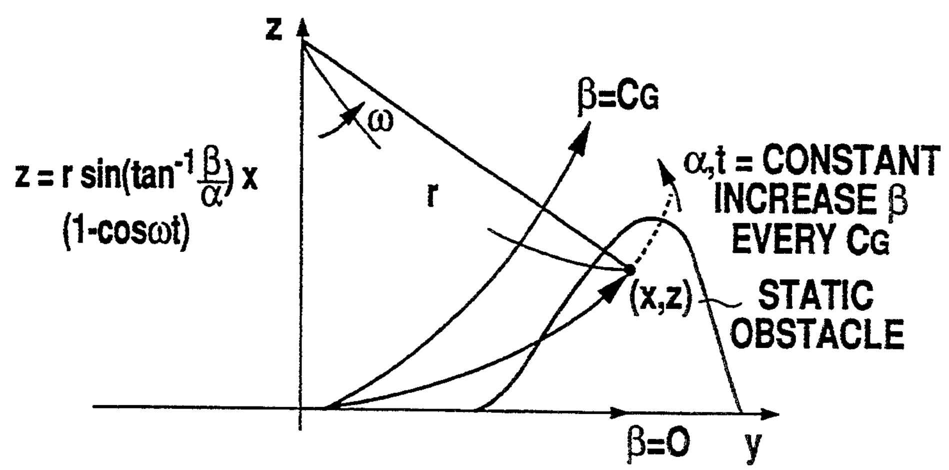
Figure 4:
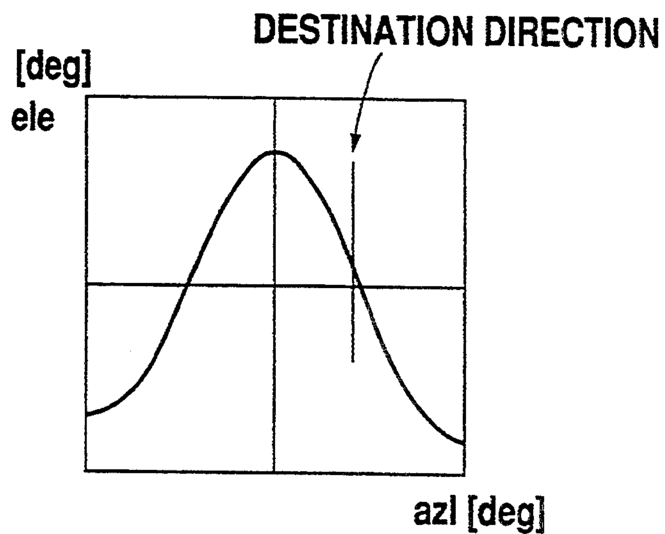
FIG. 4 is an elevational view of the static obstacle looked at from a target.
Figure 5:
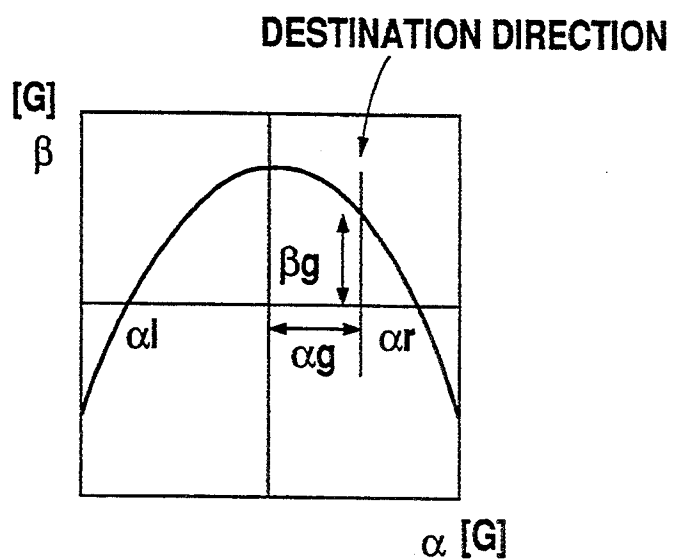
FIG. 5 is a schematic view of a result of the expression of the turning acceleration of the static obstacle shown in FIG. 4.

FIGS. 3A and 3B show a static obstacle checking method. In FIG. 3A, it is considered that $\beta=0$. In FIG. 3B, t, $\alpha$=constant and $\beta$ is varied to obtain the routes of the target. When the coordinates of a landform or terrain are located on the routes of the target, the combination $(\alpha, \beta)$ at this time becomes a data point. FIG. 4 illustrates one example of the static obstacle as viewed from the target. In FIG. 4, azimuth is plotted in the horizontal direction and elevation is plotted in the vertical direction. FIG. 5 illustrates one example of a static obstacle expressed by the turning acceleration.

In FIG. 5, $\alpha_g$; the horizontal turning acceleration for the target to direct to the destination after the predetermined time $\eta_s$, $\beta_g$; the vertical turning acceleration crossing the scope when the horizontal turning acceleration is $\alpha_g$, $\alpha_r$; the value of $\alpha$ when the scope is inclined downwards to the right hand side and crosses $\beta=0$, and $\alpha_1$; the value of $\alpha$ when the scope is inclined upwards to the right hand side and crosses $\beta=0$.

In this embodiment, the finer the unit interval as of the time, the unit interval $b_G$ of the horizontal turning acceleration and the unit interval $c_G$ of the vertical turning acceleration, the higher the accuracy of the obstacle characteristic amounts obtained.

Figure 6:
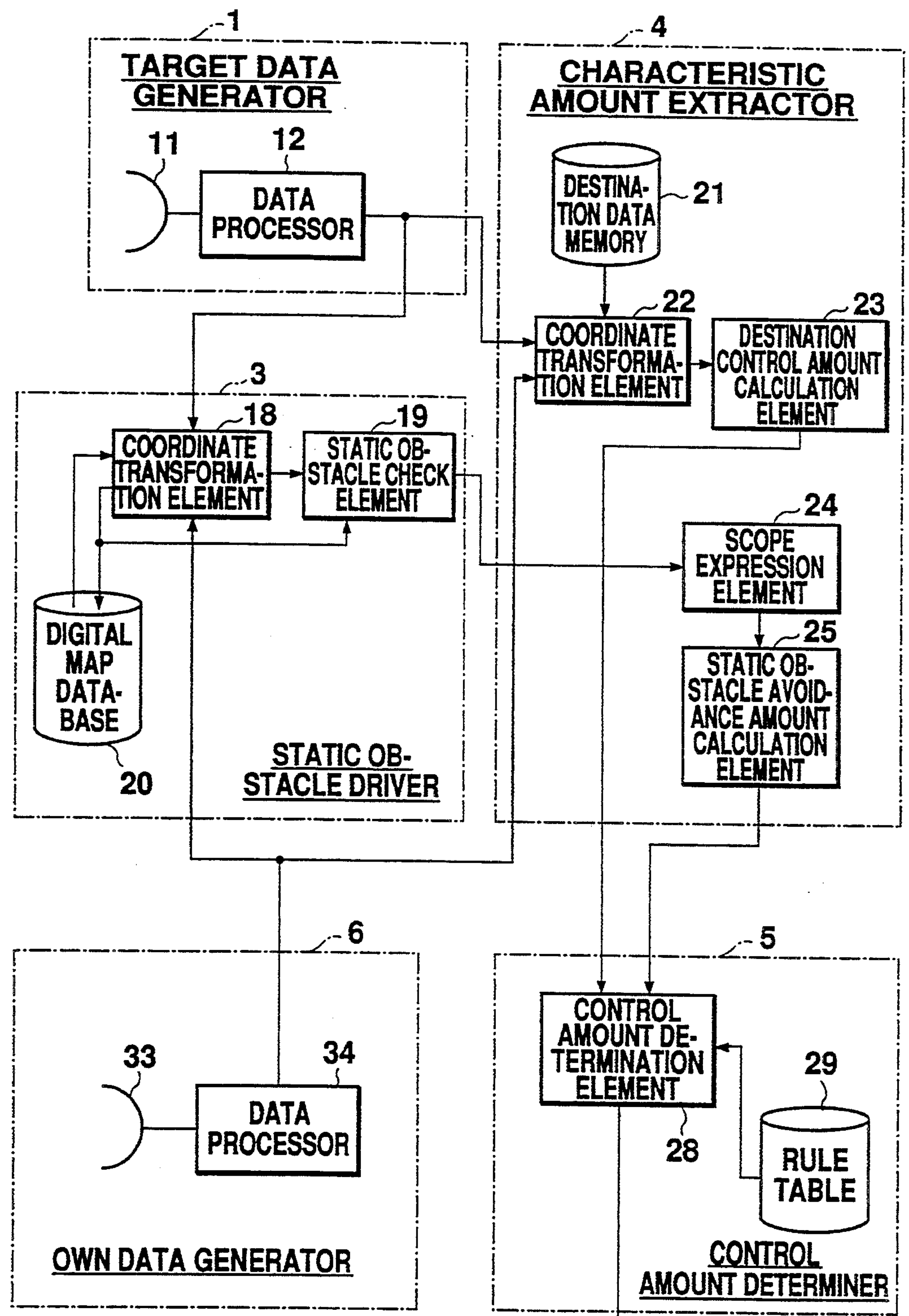
FIG. 6 is a block diagram of a second embodiment of a obstacle avoidance apparatus according to the present invention.

FIG. 6 shows the second embodiment of an obstacle avoidance apparatus according to the present invention, having the same construction as the first embodiment except that a self or own data generator 6 is further provided. In FIG. 6, the own data generator 6 is provided on an own apparatus as an observer for outputting own apparatus data for understanding own apparatus conditions. In the own data generator 6, a sensor 33 observes the self or own apparatus to output observation values, and a data processor 34 processes the output signals of the sensor 33 and outputs the own apparatus conditions to the coordinate transformation element 18 of the static obstacle driver 3 and the coordinate transformation element 22 of the characteristic amount extractor 4.

Figure 7:
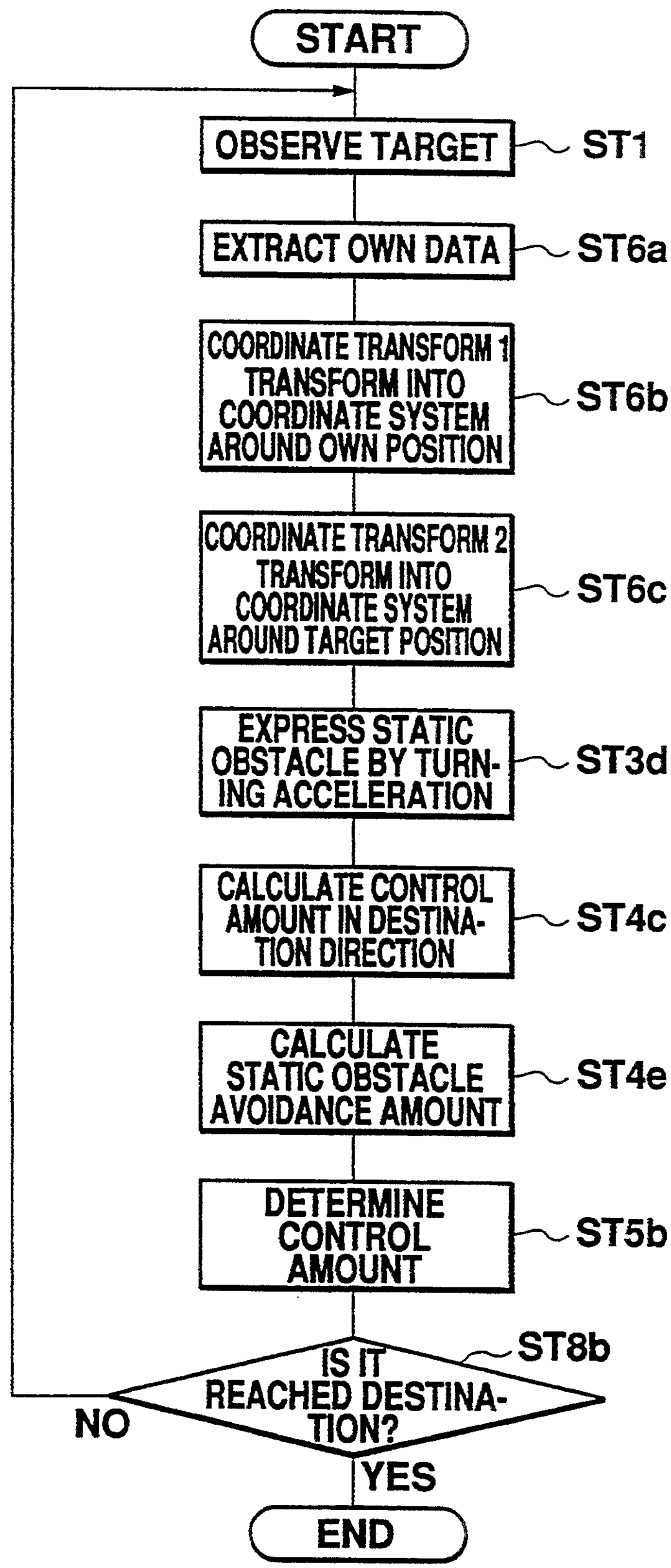
FIG. 7 is a flow chart showing an operation of the obstacle avoidance apparatus shown in FIG. 6.

Next, the operation of the above-described obstacle avoidance apparatus shown in FIG. 6 will be described in connection with FIG. 7. In this embodiment, as shown in FIG. 7, only steps ST6*a*, ST6*b* and ST6*c* are different from the operation shown in FIG. 2, and thus the description of the other steps can be omitted for brevity. In step ST6*a*, own apparatus conditions are extracted. Next, in step ST6*b*, a first coordinate transformation is carried out to change from a coordinate system around a radar position to a coordinate system around an own apparatus position, and in step ST6*c*, a second coordinate transformation is executed from the coordinate system around the own apparatus position to a coordinate system around the target position.

Figure 8:
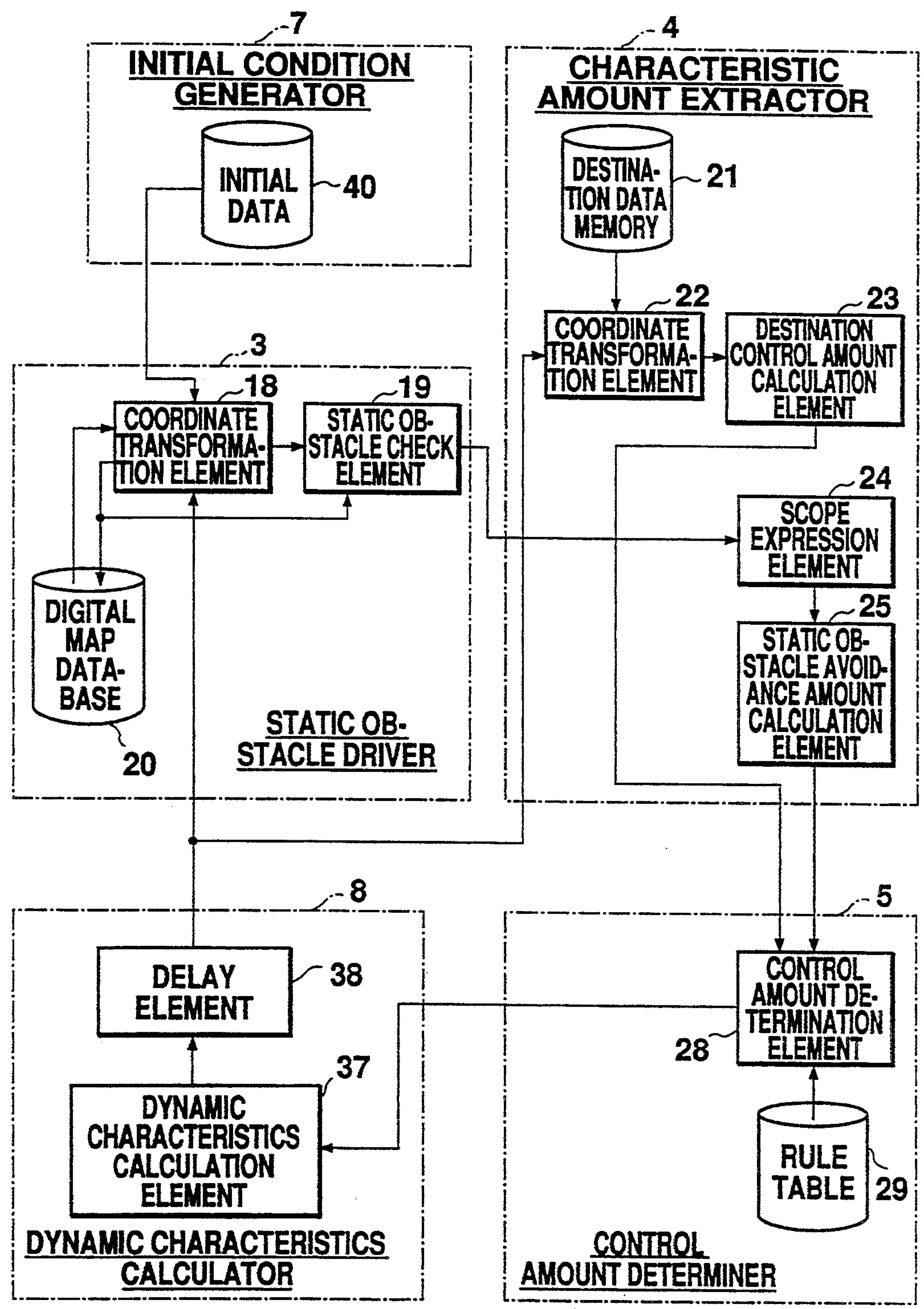
FIG. 8 is a block diagram of a third embodiment of a obstacle avoidance apparatus according to the present invention.

FIG. 8 illustrates the third embodiment of an obstacle avoidance apparatus according to the present invention. In this embodiment, an autopilot of an aircraft is supposed. In FIG. 8, an initial condition generator 7 outputs a position of the own apparatus at the start time and the like from an initial data memory 40 to the coordinate transformation element 18 of the static obstacle driver 3. A dynamic characteristics calculator 8 outputs the own apparatus conditions after a predetermined time. In the dynamic characteristics calculator 8, a dynamic characteristics calculation element 37 receives the control amount output from the control amount determiner 5 and outputs the own apparatus conditions after the predetermined time, and a delay element 38 delays the output of the dynamic characteristics calculation element 37 and outputs the delayed own apparatus conditions as next own apparatus conditions to the coordinate transformation element 18 of the static obstacle driver 3 and the coordinate transformation element 22 of the characteristic amount extractor 4.

Figure 9:
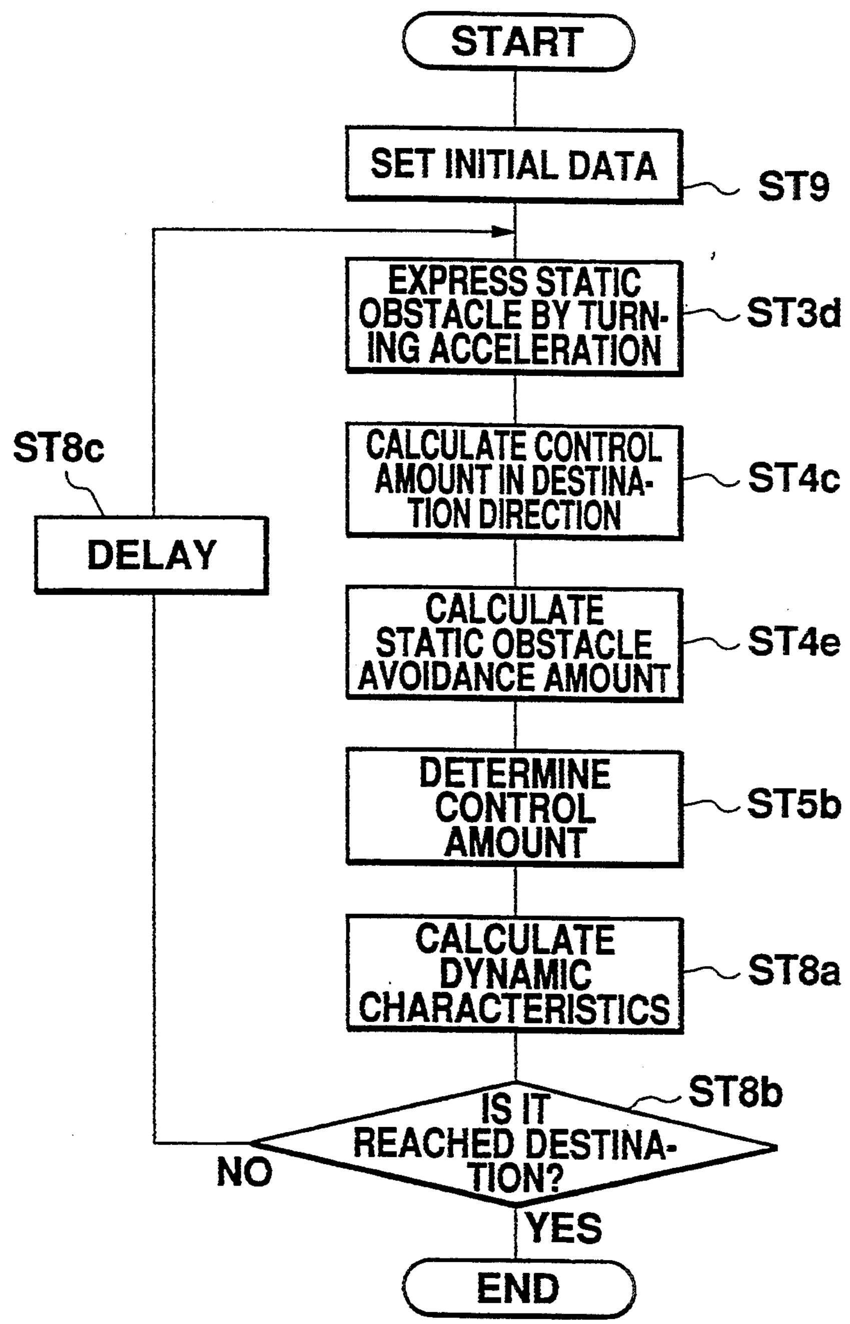
FIG. 9 is a flow chart showing an operation of the obstacle avoidance apparatus shown in FIG. 8.

Next, the operation of the above-described obstacle avoidance apparatus shown in FIG. 8 will be described in connection with FIG. 9. In this embodiment, initially, in step ST9, the conditions of the own apparatus at the start time are set from the initial condition generator 7. Then, after steps ST3*d*, ST4*c*, ST4*e* and ST5*b* in the same manner as the first embodiment, in step ST8*a*, the control amount as the output of the control amount determiner 5 is input from the dynamic characteristics calculator 8, and the own apparatus conditions after the predetermined time are output. Next, in step ST8*b*, it is discriminated from the output of the control amount determiner 5 whether or not the own apparatus can reach the destination. When the answer is YES, the operation is finished. In turn, when the answer is N0, in step ST8*c*, the output of the dynamic characteristics calculation element 37 is delayed in the delay element 38, that is, the delayed conditions are set as the next conditions of the own apparatus and the same operation as described above will be repeated.

Figure 10:
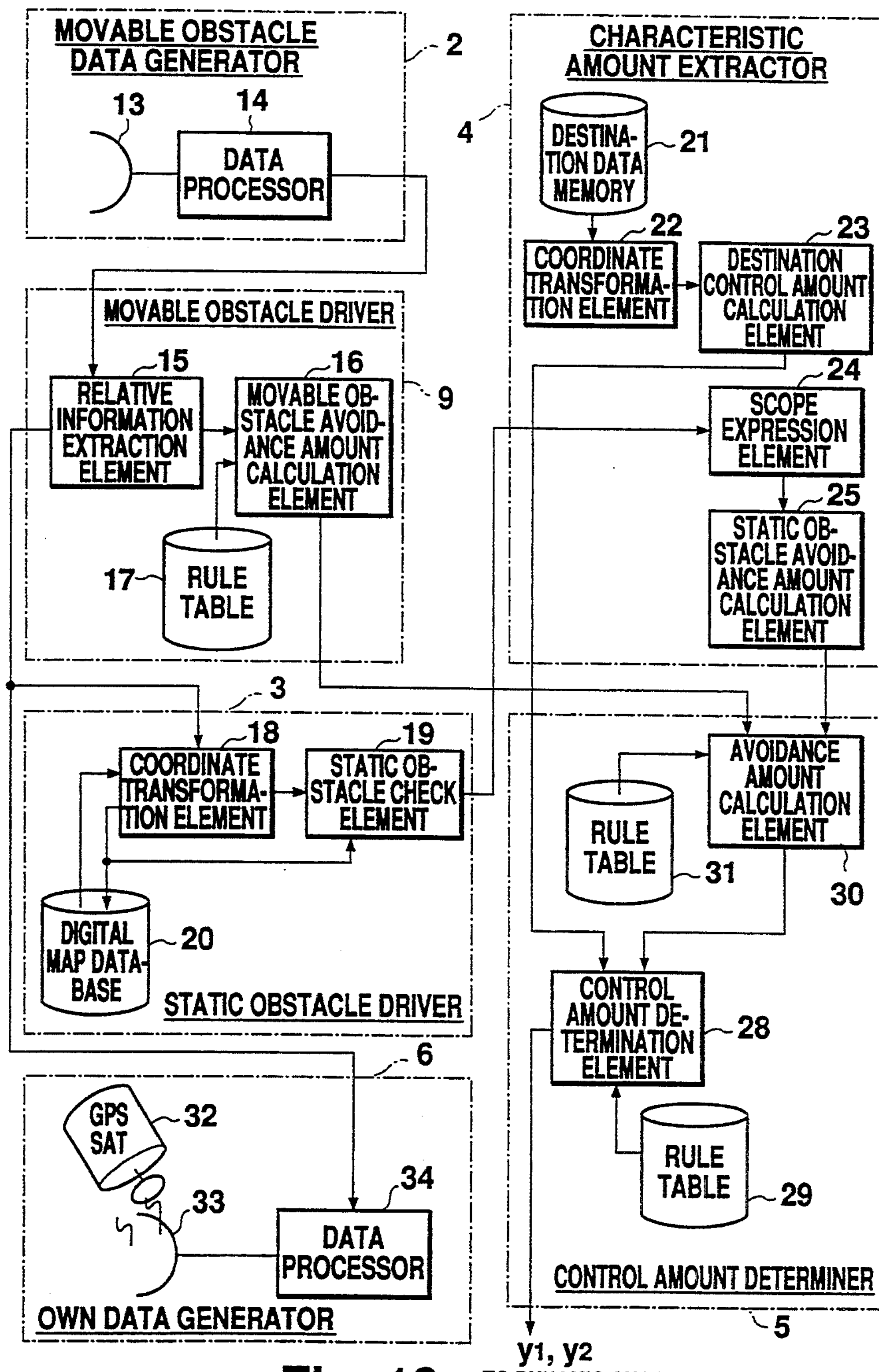
FIG. 10 is a block diagram of a fourth embodiment of a obstacle avoidance apparatus according to the present invention.

FIG. 10 illustrates the fourth embodiment of an obstacle avoidance apparatus according to the present invention. In FIG. 10, the own data generator 6 outputs the own apparatus data for understanding own apparatus conditions, and a movable obstacle data generator 2 outputs observation values of a movable obstacle except the own apparatus. Also, a movable obstacle driver 9 inputs the output of the movable obstacle data generator 2 and outputs a control amount for the own apparatus to avoid the movable obstacle, and the characteristic amount extractor 4 understands the positional relationship between the own apparatus and the static obstacle and the positional relationship between the own apparatus and the destination and outputs the control amount required for avoiding the static obstacle and the control amount required for going to the destination. Further, the control amount determiner 5 outputs an optimum control amount from the destination control amount, the movable obstacle avoidance amount and the static obstacle avoidance amount.

In the own data generator 6, a GPS (global positioning system) satellite 32 transmits the observation values of the own apparatus. The sensor 33 extracts the observation values of the GPS satellite 32 and the data processor 34 processes the output signals of the sensor 33 and extracts the own apparatus data. In the movable obstacle data generator 2, a sensor 13 observes the movable obstacle and outputs the observation values of the movable obstacle, and a data processor 14 processes the observation values of the sensor 13 and outputs the conditions of the movable obstacle. In the movable obstacle driver 9, a relative information extraction element 15 inputs the output of the movable obstacle data generator 2 and transforms the coordinates, the speed and the moving direction of the movable obstacle into the relative information with respect to the own apparatus. A movable obstacle avoidance amount calculation element 16 and a rule table 17 have the same constructions and functions as those described above. In the characteristic amount extractor 4, the coordinate transformation element 22 transforms the destination information read from the destination data memory 21 into the relative information looked at from the own apparatus, and the destination control amount calculation element 23 outputs the control amount required for going to the destination direction. Further, the scope expression element 24 executes the scope expression of the static obstacle information expressed by the turning acceleration in the static obstacle driver 3, and the static obstacle avoidance amount calculation element 25 outputs the control amount required for the static obstacle avoidance. In the control amount determiner 5, an avoidance amount calculation element 30 inputs the movable obstacle avoidance amount as the output of the movable obstacle driver 9 and the static obstacle avoidance amount as the output of the characteristic amount extractor 4 and determines an avoidance amount of the own apparatus according to a rule table 31. Further, the control amount determination element 28 inputs the destination direction control amount as the output of the destination control amount calculation element 23 of the characteristic amount extractor 4 and determines the optimum control amount of the own apparatus according to the avoidance control amount as the output of the avoidance amount calculation element 30 and the rule table 29.

Figure 11:
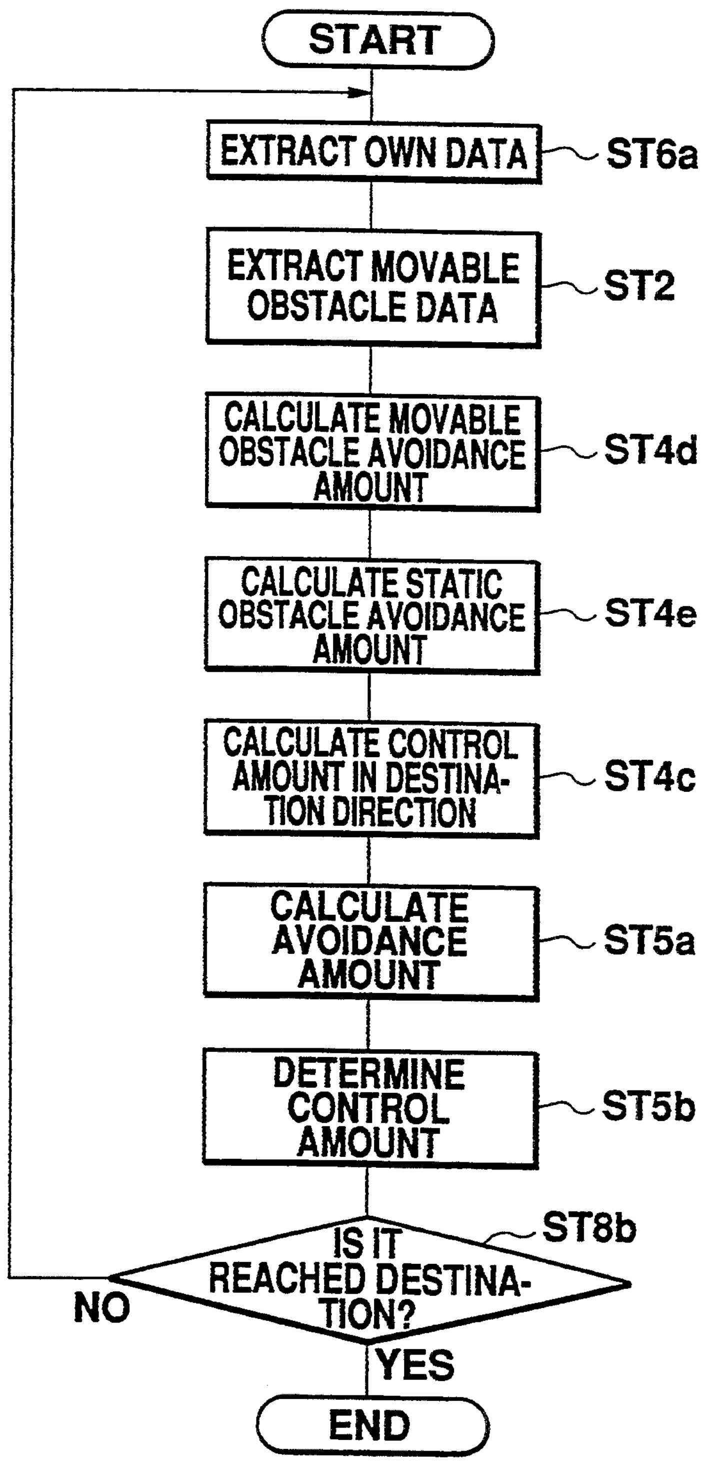
FIG. 11 is a flow chart showing an operation of the obstacle avoidance apparatus shown in FIG. 10.

Next, the operation of the above-described obstacle avoidance apparatus shown in FIG. 10 will be described in connection with FIG. 11. First, in step ST6*a*, the own apparatus conditions are output by the GPS satellite 32 in the own data generator 6, and in step ST2, the movable obstacle data are extracted in the movable obstacle data generator 2. Next, in step ST4*d*, the movable obstacle data are transformed into the relative information with respect to the own apparatus and the control amount required for avoiding the movable obstacle is calculated. In step ST4*e*, the control amount required for avoiding the static obstacle is calculated in the characteristic amount extractor 4, and in step ST4*c*, the control amount required for the own apparatus to direct to the destination direction after the predetermined time is determined. In step ST5*a*, the avoidance amount of the own apparatus is determined from the movable and static obstacle avoidance amounts obtained in steps ST4*d* and ST4*e*. Further, in step ST5*b*, the destination control amount and the avoidance amount are input and the optimum control amount of the own apparatus is determined according to the rule table 29. In step ST8*b*, the operation is carried out in the same manner as described above.

As described above, according to the obstacle avoidance apparatus in the first embodiment, the static obstacle driver for expressing the three-dimensional obstacle by using the turning acceleration of the target is provided and hence the three-dimensional obstacle can be modeled by several characteristic amounts. As a result, the control amount can be decided.

Further, according to the obstacle avoidance apparatus in the second embodiment, the own data generator for outputting the own apparatus data for understanding the own apparatus position is provided and thus, even when the observation side is moved, the control amount of the target can be decided.

Also, according to the obstacle avoidance apparatus in the third embodiment, the dynamic characteristics calculator for obtaining the own apparatus conditions from the calculated control amount after the predetermined time is provided and hence depending on the landform situation, the control of the own apparatus can be automatically decided.

Further, according to the obstacle avoidance apparatus in the fourth embodiment, the own data generator for observing the own apparatus conditions by the GPS satellite and the movable obstacle data generator for understanding the movable obstacle are provided and hence the operation can be performed while avoiding the movable obstacle.

Although the present invention has been described in its preferred embodiments with reference to the accompanying drawings, it it readily understood that the present invention is not restricted to the preferred embodiments and that various changes and modifications can be made by those skilled in the art without departing from the spirit and scope of the present invention.

What is claimed is:

1. An obstacle avoidance apparatus, comprising:

a digital map database for storing digital map information including positional information about a static obstacle;

destination data memory for storing destination data including positional information about a destination to be reached by a controlled target;

a target data generator for observing the target to be controlled and for outputting target data as observation values;

a static obstacle driver for outputting a turning acceleration of the target derived from the target data and the map information;

a characteristic amount exactor for extracting characteristic amounts based on a positional relationship between the target and the static obstacle and a positional relationship between the target and the destination, the characteristic amounts being derived from the turning acceleration and the destination data, and for outputting the characteristic amounts; and a control amount determiner for determining a control signal to control the target to avoid the static obstacle, the control signal being derived from the characteristic amounts.

2. The obstacle avoidance apparatus of claim 1, further comprising:

an observer data generator for measuring conditions including positional information about a moving observer and for outputting observer data;

wherein the turning acceleration of the target outputted by the static obstacle driver is further derived from the observer data output from the observer data generator.

3. The apparatus of claim 2, wherein the observer is a flying object.

4. The apparatus of claim 2, wherein the static obstacle is a landform.

5. The apparatus of claim 1, wherein the static obstacle is a landform.

6. An obstacle avoidance apparatus for a target to avoid a static obstacle, comprising:

a target data generator for providing positional information about the target;

a digital map database for storing digital map information including positional information about a static obstacle;

destination data memory for storing destination data including positional information about a destination to be reached;

an initial condition generator for determining conditions of an observer at a start time, and for outputting the conditions;

a static obstacle driver for outputting static obstacle information expressing a static obstacle by providing a turning acceleration of the observer on the basis of the map information;

a characteristic amount extractor for determining positional relationships among the observer, the target, the destination, and the static obstacle, and for outputting the extracted characteristic amounts;

a control amount determiner for determining a control amount of the observer on the basis of the characteristic amounts output from the characteristic amount extractor; and a dynamic characteristics calculator for calculating conditions of the observer after a predetermined time from the start time on the basis of the control amount output from the control amount determiner, and for outputting calculated conditions.

7. The apparatus of claim 6, wherein the observer is a flying object.

8. The apparatus of claim 6, wherein the static obstacle is a landform.

9. An obstacle avoidance apparatus, comprising:

a digital map database for storing digital map information including positional information about a static obstacle;

destination data memory for storing destination data including positional information about a destination to be reached;

an observer data generator for outputting conditions of an observer on the basis of observation values obtained from a global positioning system;

a movable obstacle data generator for observing a movable obstacle except the observer and for outputting movable obstacle data;

a movable obstacle driver for outputting a control amount required for the observer to avoid the movable obstacle, the control amount being derived from the movable obstacle data;

a static obstacle driver for outputting static obstacle information expressing a static obstacle by a turning acceleration of the observer based on the map information;

a characteristic amount extractor for grasping a positional relationship between the own apparatus and the static obstacle and a positional relationship between the observer and the destination based on the static obstacle information output from the static obstacle driver and the destination data of the destination data memory, and for outputting a control amount required for static obstacle avoidance and a control amount for directing the observer to the destination;

a control amount determiner for determining a control amount of the observer based on the control amount required for the static obstacle avoidance, the control amount required for directing the observer to the destination, output from the characteristic amount extractor and the control amount required for the own apparatus to avoid the movable obstacle output from the movable obstacle driver; and a dynamic characteristics calculator for calculating conditions of the own apparatus after a predetermined time on the basis of the control amount output from the control amount determiner and the outputting the calculated conditions.

10. The apparatus of claim 9, wherein the observer is a flying object.

11. A method for directing a target to avoid a static obstacle, the method comprising the steps of:

observing the target;

outputting target data including positional information about the target;

providing turning acceleration data for the target, the turning acceleration data being derived from the target data and from map information stored in a database including positional information about the static obstacle, the turning acceleration being for the target to avoid the static obstacle; and providing a control signal to control the target based at least in part on the turning acceleration data.

12. The method of claim 11, wherein the step of providing turning acceleration data includes timewisely stepping turning acceleration values and calculating positions of the target for each of the stepped values.

13. The method of claim 12, further including the step of comparing the calculated positions of the target and the map information to determine whether the calculated positions are coincident with the position of the static obstacle.

* * * * *